(12) United States Patent
Ku

(10) Patent No.: US 10,984,465 B2
(45) Date of Patent: Apr. 20, 2021

(54) ORDER INTEGRATION SYSTEM AND INTEGRATION METHOD THEREOF

(71) Applicant: Wei-Chun Ku, Miaoli County (TW)

(72) Inventor: Wei-Chun Ku, Miaoli County (TW)

(*) Notice: Subject to any disclaimer, the term of this patent is extended or adjusted under 35 U.S.C. 154(b) by 205 days.

(21) Appl. No.: 16/172,849

(22) Filed: Oct. 28, 2018

(65) Prior Publication Data
US 2019/0197603 A1    Jun. 27, 2019

(30) Foreign Application Priority Data

Dec. 22, 2017   (TW) .................................. 106145211

(51) Int. Cl.
| | | |
|---|---|---|
| G06Q 30/00 | (2012.01) | |
| G06Q 30/06 | (2012.01) | |
| G06Q 50/00 | (2012.01) | |
| H04L 29/08 | (2006.01) | |
| G06F 9/54 | (2006.01) | |

(52) U.S. Cl.
CPC ......... *G06Q 30/0641* (2013.01); *G06F 9/547* (2013.01); *G06Q 30/0633* (2013.01); *G06Q 50/01* (2013.01); *H04L 67/20* (2013.01)

(58) Field of Classification Search
None
See application file for complete search history.

(56) References Cited

U.S. PATENT DOCUMENTS

| | | | |
|---|---|---|---|
| 8,326,743 B1 | 12/2012 | Smith | |
| 9,299,099 B1* | 3/2016 | Jayaram | ............. G06Q 30/0631 |
| 2002/0111874 A1* | 8/2002 | Al-Kazily | .............. G06Q 30/02 |
| | | | 705/26.41 |
| 2011/0137994 A1* | 6/2011 | Kumar | ................... G06Q 10/10 |
| | | | 709/204 |

(Continued)

FOREIGN PATENT DOCUMENTS

| | | |
|---|---|---|
| CN | 1582012 | 2/2005 |
| TW | I578252 | 4/2017 |

OTHER PUBLICATIONS

Luisana Cartay "How To Integrate Social Media Into Your Website To Increase Your Ecommerce Sales" Jan. 24, 2017. Retrieved from https://www.digitaldoughnut.com/articles/2017/january/how-to-integrate-social-media-into-your-website-to (Year: 2017).*

*Primary Examiner* — Naeem U Haq
(74) *Attorney, Agent, or Firm* — JCIPRNET

(57) ABSTRACT

An order integration system and an order integration method are provided. The order integration system includes a social connection module, a plurality of order message recognition modules, and an integration module. The social connection module is used to link a plurality of application programming interfaces of a plurality of social groups corresponding to a plurality of social authentication information of a user according to a plurality of social authentication information of the user. The plurality of order message recognition modules is set on the plurality of social groups respectively to determine a plurality of purchase messages provided by (Continued)

users on the plurality of social groups. The integration module is used to receive the plurality of purchase messages through the plurality of order message recognition modules and integrate the plurality of purchase messages into an integration order according to a system authentication information of the user.

14 Claims, 3 Drawing Sheets

(56) References Cited

U.S. PATENT DOCUMENTS

| | | | | |
|---|---|---|---|---|
| 2012/0110072 A1* | 5/2012 | de Villiers | ............. | G06Q 50/01 709/204 |
| 2012/0171999 A1* | 7/2012 | Im | ........................ | H04W 12/06 455/411 |
| 2012/0290414 A1* | 11/2012 | Harman | ................. | G06Q 50/12 705/15 |
| 2014/0032376 A1* | 1/2014 | Tyagi | ................. | G06Q 30/0601 705/27.1 |
| 2014/0081750 A1* | 3/2014 | Hosp | .................. | G06Q 30/0207 705/14.53 |
| 2014/0081844 A1* | 3/2014 | Hosp | ...................... | G06Q 20/22 705/39 |
| 2014/0100985 A1* | 4/2014 | Lenahan | ................. | G06Q 50/01 705/26.4 |
| 2014/0214931 A1* | 7/2014 | Sidhu | ...................... | H04L 67/12 709/204 |
| 2014/0279616 A1* | 9/2014 | Aoki | .................. | G06Q 30/0282 705/319 |
| 2015/0120386 A1* | 4/2015 | Sherman | ................ | G06Q 50/01 705/7.31 |
| 2018/0040059 A1* | 2/2018 | Cruz | .................. | G06Q 30/0643 |
| 2018/0300406 A1* | 10/2018 | LaRowe | ................ | G06Q 10/10 |

* cited by examiner

ORDER INTEGRATION SYSTEM AND INTEGRATION METHOD THEREOF

CROSS-REFERENCE TO RELATED APPLICATION

This application claims the priority benefit of Taiwan application serial no. 106145211, filed on Dec. 22, 2017. The entirety of the above-mentioned patent application is hereby incorporated by reference herein and made a part of this specification.

BACKGROUND

Technical Field

The disclosure relates to an order generation system and an order generation method, in particular, related to an order integration system and an integration method thereof.

Description of Related Art

In recent years, online social group sites have become the main platform for today's information dissemination, also the main shopping platform. Consumers can make purchases directly or indirectly through the product information from online social groups.

However, current social groups order creation system is mostly order creation for a single social group. There are currently many online social group platforms, such as LINE, Facebook, Wechat, Twitter, Flickr or Google+, Instagram, etc. When many consumers order products through the above multiple online social group platforms, how sellers efficiently integrate orders from different social groups, and efficiently distribute and manage orders from different social group community, is one of the important issues to be solved next.

SUMMARY

The disclosure provides an order integration system and an order integration method that can efficiently integrate orders from different networking social groups.

The order integration system of the disclosure includes a social connection module, a plurality of order message recognition modules and an integration module. The social connection module is configured to link a plurality of application programming interfaces of a plurality of the social groups corresponding to a plurality of the social authentication information according to the plurality of social authentication information of a user. The plurality of order message recognition modules are respectively set in the plurality of social groups and configured to determine the plurality of user purchase information provided by the plurality of social groups through the plurality of application programming interfaces. The integration module receives a plurality of purchase messages through the plurality of order message recognition modules, and integrates the plurality of purchase messages into an integration order based on a system authentication information of the user.

In an embodiment of the disclosure, the plurality of purchase messages each includes at least one of a plurality of product names of a purchase operation interface of the social groups, a plurality of styles corresponding to the plurality of product names, and at least one of a purchase quantities corresponding to the plurality of styles.

In an embodiment of the disclosure, the order integration system further includes a login switching module. The login switching module is used to enable the user to log in to the other social groups in the plurality of social groups in the already signed-in social groups in the plurality of social groups.

In an embodiment of the disclosure, the plurality of order message recognition modules provide a plurality of purchase operation interfaces in the plurality of social groups.

In an embodiment of the disclosure, the order integration system receives the system authentication information of the user to enable the user to log in to the order integration system.

In an embodiment of the disclosure, the integration module creates the plurality of purchase messages into the integration order according to the system authentication information.

In an embodiment of the disclosure, the order integration system also includes a product database. The product database is used to record the plurality of styles corresponding to the plurality of product names and the inventory information corresponding to the plurality of styles.

In an embodiment of the disclosure, the integration module also integrates the product database and the integration order.

The order integration method of the disclosure, including: linking a plurality of application programming interfaces of a plurality of social groups corresponding to a plurality of social authentication information according to the plurality of social authentication information of a user; determining a plurality of purchase messages provided by the users on the plurality of social groups through the plurality of application programming interfaces; and receiving the plurality of purchase messages and creating the plurality of purchase messages into an integration order according to a system authentication information of the user.

Based on the above, the order integration system of the disclosure connects the plurality of application programming interfaces of the plurality of social groups corresponding to the plurality of social authentication information according to the plurality of social authentication information of the users, determine the plurality of purchase messages provided by users on the plurality of social groups, and the plurality of purchase messages are integrated into the integration order, so that the order integration system can efficiently integrate orders coming from different social groups.

In order to make the above features and advantages of the disclosure more obvious and comprehensible, several embodiments accompanied with drawings are described in detail as follows.

DESCRIPTION OF THE EMBODIMENTS

Figure 1:
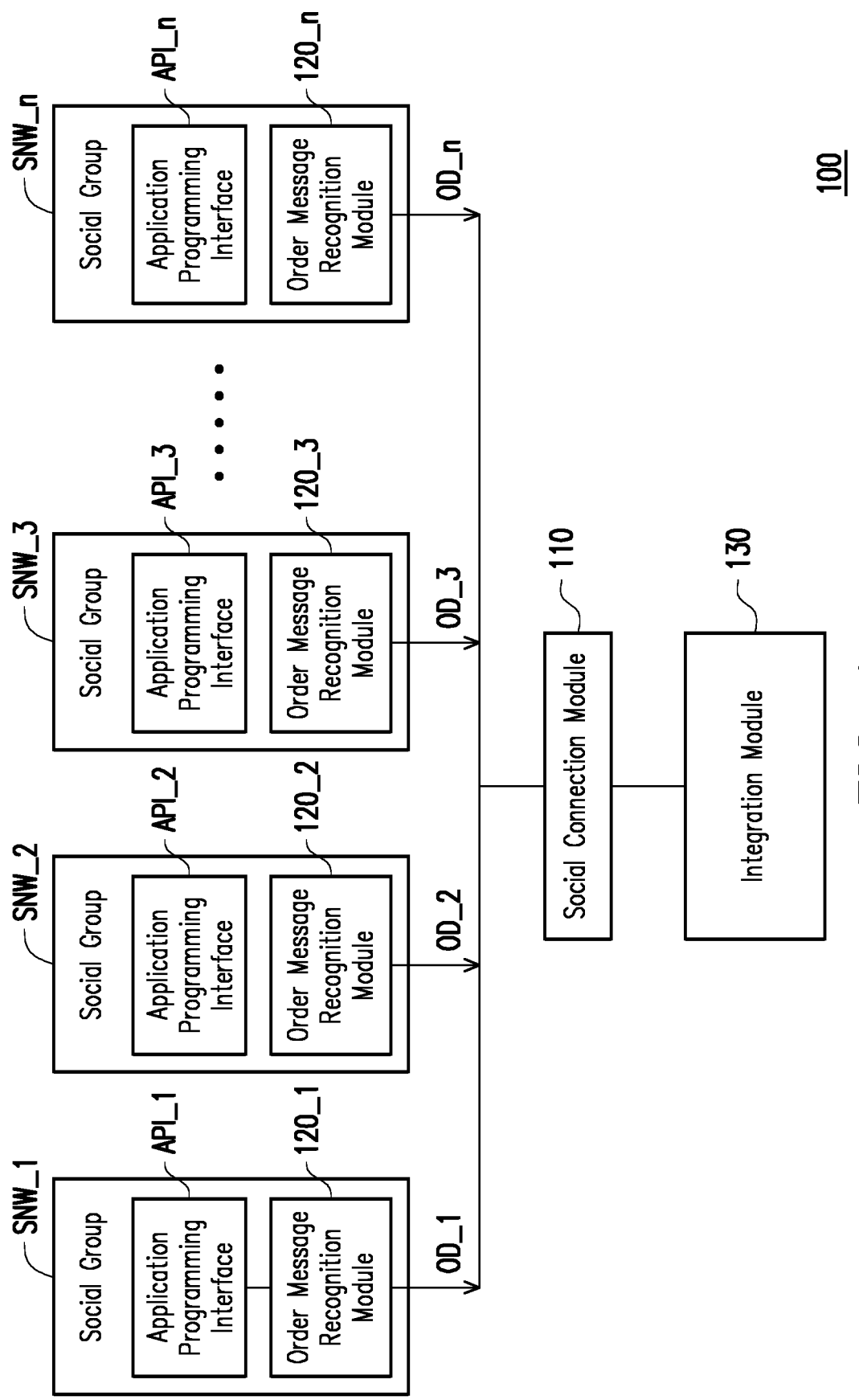
FIG. 1 is a schematic diagram of an order integration system according to an embodiment of the disclosure.

Please refer to FIG. 1, FIG. 1 is a schematic diagram of an order integration system according to an embodiment of the disclosure. The order integration system 100 can be connected to social groups SNW_1~SNW_n. In the embodiment of FIG. 1, the order integration system 100 includes a social connection module 110, order message recognition modules 120_1~120_n, and an integration module 130. The social connection module 110 is configured to use a plurality of social authentication information of the users to link the application programming interfaces API_1~API_n of the social groups SNW_1~SNW_n corresponding to the plurality of social authentication information. The order message recognition modules 120_1~120_n are respectively set in the social groups SNW_1~SNW_n for determining the purchase information OD_1~OD_n provided by the users in the social groups SNW_1~SNW_n. The integration module 130 receives the purchase information OD_1~OD_n through the order message recognition modules 120_1~120_n, and creates the purchase information OD_1~OD_n as the integration order according to the system authentication information of the user. In this embodiment, the social groups SNW_1~SNW_n can be LINE, Instagram, Facebook Messenger, Facebook fan page, Facebook social groups, WeChat, Twitter, Flickr or Google+, Instagram and other online social group platforms, or the social groups SNW_1~SNW_n can be different groups in the above network social group platform, and the groups are for example, LINE "Groups"; Facebook "Groups", "twitter list" and Google "Spaces" etc. There is no fixed limit to the number and types of social groups of the disclosure.

Further explained, in the embodiment of FIG. 1, the user needs to submit the system authentication information to complete a login authentication of the order integration system 100. The social authentication information of the user in the social groups SNW_1~SNW_n is the login information corresponding to the above website or group, for example, the use's account number, contact number and email address. Under the premise that the user has the login authority of the plurality of social groups SNW_1~SNW_n, the social connection module 110 of the order integration system 100 can connect to the plurality of social groups SNW_1~SNW_n that the user can log-in via wired or wireless network according to the plurality of social authentication information of the user in the plurality of social groups SNW_1~SNW_n.

Then, the order integration system 100 can set the order message recognition module 120_1 to a social group SNW_1, and connect to an application programming interface API_1 of the social group SNW_1. The order integration system 100 also sets an order message recognition module 120_2 to a social group SNW_2, and connect to an application programming interface API_2 of the social group SNW_2, the order integration system 100 also sets an order message recognition module 120_3 to a social group SNW_3, and connect to an application programming interface API_3 of the social group SNW_3, so on and so forth. In some embodiments, the order message recognition modules 120_1~120_3 can be respectively disposed inside the application programming interface API_1~API_3.

In this embodiment, an order message identification module 120_1 can determine whether a purchase message OD_1 is generated in the social group SNW_1 through an application programming interface API_1. An order message identification module 120_2 can determine whether a purchase message OD_2 is generated in the social group SNW_2 through an application programming interface API_2. An order message identification module 120_3 can determine whether a purchase message OD_3 is generated in the social group SNW_3 through an application programming interface API_3, so on and so forth.

In this embodiment, the user's role can be a seller user and/or a buyer user. The order message identification modules 120_1~120_n can provide the purchase operation interfaces in the social groups SNW_1~SNW_n according to the settings of the seller user or the buyer user. The purchase operation interface may be a message such as a message, an article, or the like purchased by a seller user or a buyer user, or a purchase form created by the seller user or the buyer user. Buyers who want to buy goods can respond in a message, article or product purchase form, for example, in the purchase operation interface, the relevant message for purchasing the product or the style and quantity of the product in the product purchase form are noted, to express the willingness to buy. In this embodiment, the purchase message OD_1~OD_n respectively includes at least one of a plurality of product names of the purchase operation interfaces of the social groups SNW_1~SNW~n, the plurality of styles corresponding to the product names, and a purchase quantity corresponding to the styles.

The order message identification modules 120_1~120_n determine that the purchase message OD_1~OD_n has been generated, the integration module 130 can receive the purchase message OD_1~OD_n through the order message identification module 120_1~120_n, and integrates the purchase message OD_1~OD_n as the integration order according to the system authentication information of the buyer user. That is, the integration module 130 can integrate the purchase messages OD_1~OD_n according to the identity of the buyer user to integrate the integration order.

For example, a first buyer user ordered products in the social groups SNW_1 and SNW_2 respectively, and a second buyer user ordered products in the social groups SNW_2 and SNW_3 respectively. The first buyer user and the second buyer user jointly provide purchase messages OD_1, OD_2, and OD_3. The integration module 130 can receive the purchase message OD_1~OD_n through the order message identification module 120_1~120_n. The integration module 130 can establish the purchase messages OD_1, OD_2 in the purchase messages OD_1~OD_n as the integration order of the first buyer user according to a system authentication information (such as account number or name) of the first buyer user. The integration module 130 can establish the purchase messages OD_2, OD_3 in the purchase messages OD_~OD_n as the integration order of the second buyer user according to the system authentication information of the second buyer user.

In this embodiment, the functions of the social connection module 110 and the integration module 130 can be performed by at least one processing device (not shown). The order message identification modules 120_1~120_n can also be executed by at least one processing device. The processing device may be implemented as a central processing unit (CPU), or other programmable general purpose or special purpose microprocessors, digital signal processors (DSPs), programmable controllers, and application specific integrated circuits (ASIC), Programmable Logic Device (PLD) or other similar device or a combination of these devices.

It is worth mentioning here that, the order integration system 100 can determine whether the purchase message OD_1~OD_n is generated in the social groups SNW_1~SNW_n according to the social authentication information of the social groups SNW_1~SNW_n by the same user. When the purchase message OD_1~OD_n is generated, receive purchase message OD_1~OD_n. So the order integration system 100 can receive the purchase messages OD_1~OD_n provided by the same user on the social groups SNW_1~SNW_n. In addition, the order integration system 100 can also establish the purchase messages OD_1~OD_n as an integration order according to the system authentication information of the user. Thereby, the order integration system 100 can integrate orders coming from different social groups SNW_1~SNW_n according to the user's identity in the order integration system 100.

Figure 2:
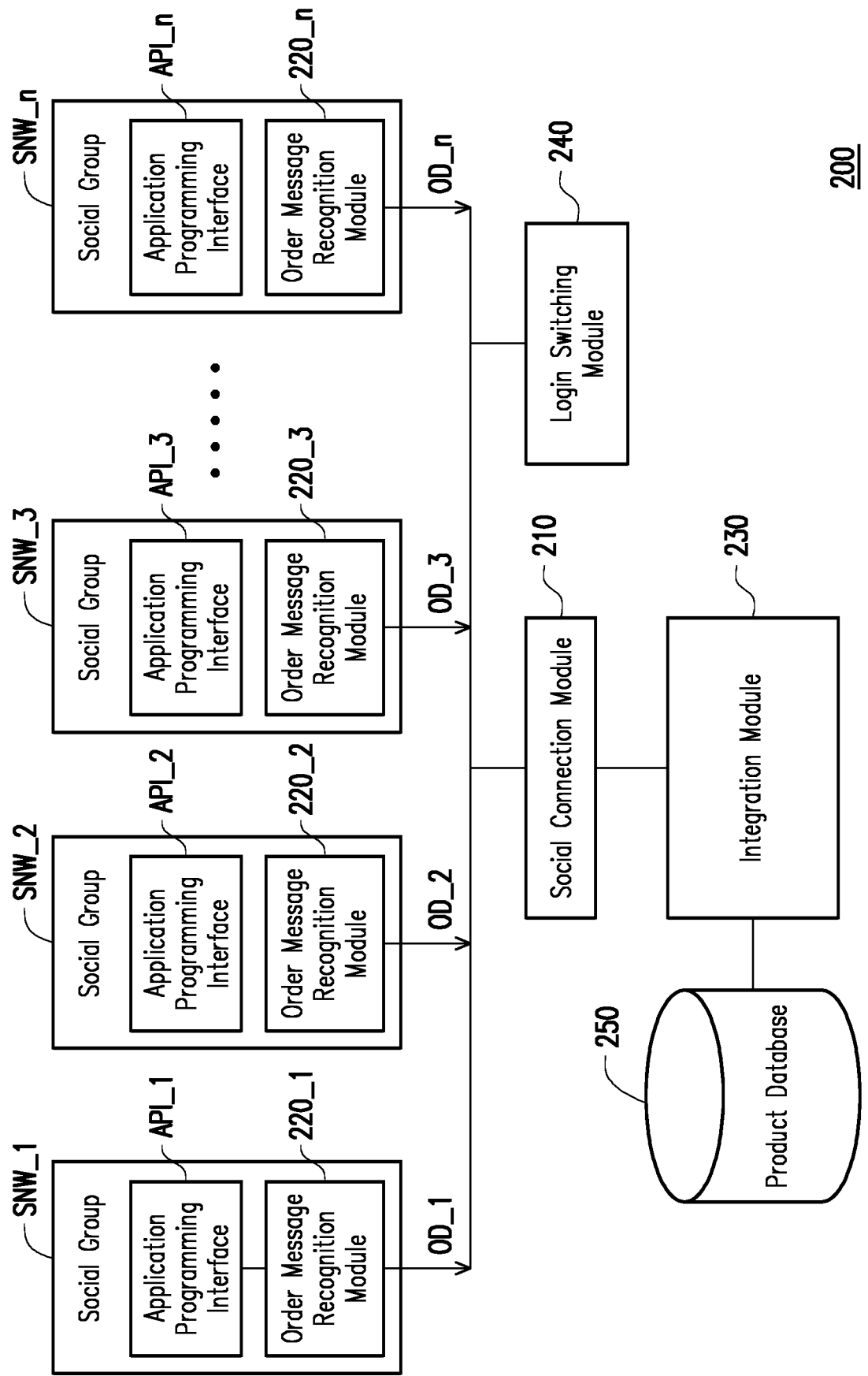
FIG. 2 is a schematic diagram of an order integration system according to another embodiment of the present disclosure.

Please refer to FIG. 2, FIG. 2 is a schematic diagram of an order integration system according to another embodiment of the disclosure. Different from FIG. 1 is that the order integration system 200 in FIG. 2 further includes a login switching module 240 and a product database 250.

In the embodiment of FIG. 2, the login switch module 240 allows the user to log in to other social groups in the already logged-in social groups among the social groups SNW_1~SNW_n. The login switching module 240 can generate a login switching interface. The login switch interface lists all social groups SNW_1~SNW_n corresponding to all social authentication information of the user or other social groups outside the already logged-in social groups. The user can log in to the order integration system 200 and log in to the logged-in social groups, then choose to log in to other social groups through the login switch interface. For example, after the user logs into the order integration system 200, and log in to the social group SNW_1. The login switching module 240 can generate a login switching interface in the display page of the social group SNW_1 or outside the display page of the social group SNW_1, the user can select other social groups SNW_2~SNW_n through the login switch interface. When the user selects the social group SNW_2 through the login switching interface, the login operation of the social group SNW_2 can be completed.

The product database 250 is used to record the plurality of styles corresponding to the plurality of product names and inventory information corresponding to the plurality of styles. The integration module 230 can integrate the inventory information of the product database 250 and at least one integration order. The seller user can integrate the purchase messages OD_1~OD_n into a plurality of integration orders based on the system authentication information (such as the buyer user's account number or name) of a plurality of buyer users. Also, the integration module 230 can integrate inventory information and the plurality of integration orders, to monitor inventory information corresponding to the style of each item in the plurality of integration orders. Therefore, seller users can handle ordering, shipping, automatic dispensing, etc. more efficiently. In this embodiment, the product database 250 can be, for example, a database of Access, FoxPro, SQL Server, Oracle, Sybase, DB2, MySQL, etc., and the database is represented as a method of data collection, the product database of the disclosure is not limited to the data collection method exemplified above.

Figure 3:
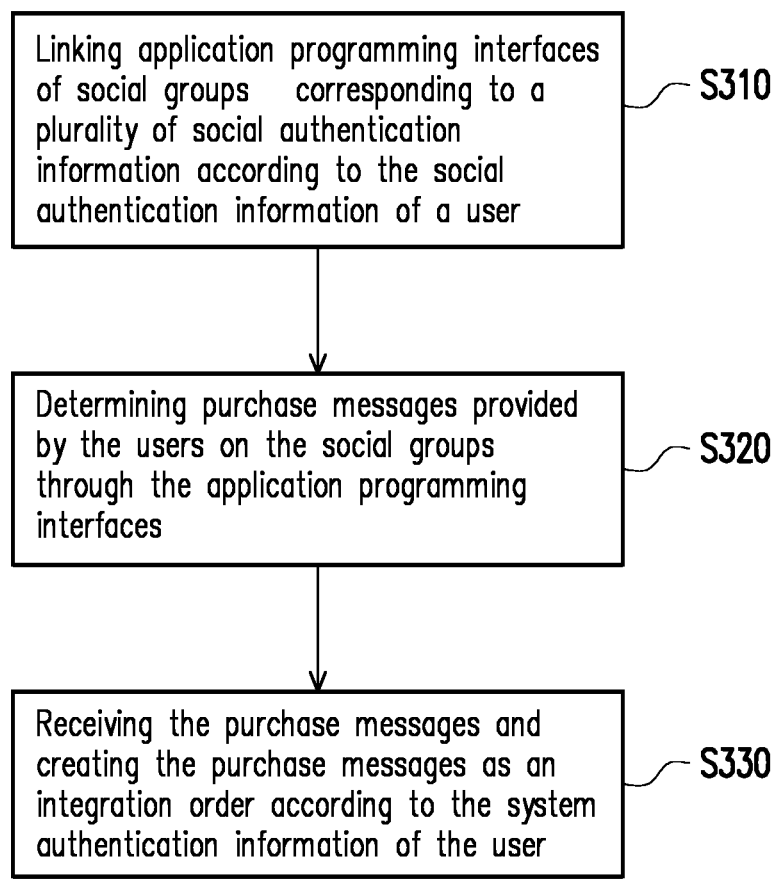
FIG. 3 is a flowchart of an order integration method according to an embodiment of the disclosure.

Please also refer to FIG. 1 and FIG. 3, FIG. 3 is a flowchart of an order integration method according to an embodiment of the disclosure. In step S310, linking application programming interfaces of social groups SNW_1~SNW_n corresponding to a plurality of social authentication information according to the plurality of social authentication information of a user. In step S320, determining a plurality of purchase messages OD_1~OD_n provided by the users on the social groups SNW_1~SNW_n through the application programming interfaces. And in step S330, receiving the purchase messages OD_~OD_n and creating the purchase messages OD_1~OD_n as an integration order according to the system authentication information of the user. The implementation details of the above steps have been explained in detail in the foregoing embodiment of FIG. 1, therefore will not be repeated here.

In summary, the order integration system of the disclosure links the application programming interfaces of the plurality of social groups corresponding to the plurality of social authentication information according to the plurality of the user's social authentication information, determine the plurality of purchase messages provided by the users in the plurality of social groups, and integrate the plurality of purchase messages into the integration order, so that the order integration system can efficiently integrate orders coming from different social groups. Other than this, the integration module further integrates inventory information and at least one integrated order so that users can more efficiently process orders, shipments, automatic parts, etc.

Although the disclosure has been disclosed by way of embodiments, however, it is not intended to limit the disclosure, it will be apparent to one of ordinary skill in the art that modifications to the described embodiments may be made without departing from the spirit of the disclosure. Accordingly, the scope of the disclosure will be defined by the attached claims.

What is claimed is:

1. An order integration system, comprising:
a social connection processor, configured to link a plurality of application programming interfaces of a plurality of social groups corresponding to a plurality of social authentication information of a user according to the plurality of social authentication information of the user and a system authentication information of the user, wherein the system authentication information of the user is used to login the order integration system;
a plurality of order message recognition processors, respectively set in the plurality of social groups, and configured to determine a plurality of purchase messages provided by the users on the plurality of social groups through the plurality of application programming interfaces;
an integration processor, configured to communicate with the plurality of order message recognition processors through the social connection processor, receive the plurality of purchase messages through the plurality of order message recognition processors, and creating the plurality of purchase messages into an integration order according to the system authentication information of the user; and
a login switch processor, configured to communicate with the plurality of order message recognition processors, generate a login switching interface in a first social group of the plurality of social groups, wherein the login switching interface lists the plurality of social groups, wherein the login switch processor enables the user select a second social group of the plurality of social groups listed in the login switching interface, so as to log in to the second social group from the first social group.

2. The order integration system according to claim 1, wherein each of the plurality of purchase messages comprises at least one of a plurality of product names from at least one purchase operation interface of the plurality of social groups, a plurality of styles corresponding to the plurality of product names, and a purchase quantity corresponding to the plurality of styles.

3. The order integration system according to claim 1, wherein the plurality of order message recognition processors respectively provide at least one purchase operation interface in the plurality of social groups.

4. The order integration system according to claim 1, wherein the order integration system receives the system authentication information of the user to enable the user to log in to the order integration system.

5. The order integration system according to claim 4, wherein the integration processor integrates the plurality of purchase messages into the integration order according to the system authentication information.

6. The order integration system according to claim 1, wherein the order integration system further comprises:
   a product database, coupled to the integration processor, and configured to record a plurality of styles corresponding to a plurality of product names and an inventory information corresponding to the plurality of styles.

7. The order integration system according to claim 6, wherein the integration processor is further configured to integrate an inventory information of the product database and the integration order to monitor an inventory information corresponding to the integration order.

8. An order integration method for an order integration system, wherein the order integration system comprises a social connection processor, a plurality of order message recognition processors, an integration processor and a login switch processor, wherein the order integration method comprises:
   linking, using the social connection processor, a plurality of application programming interfaces of a plurality of social groups corresponding to a plurality of social authentication information of a user according to the plurality of social authentication information of the user and a system authentication information of the user, wherein the system authentication information of the user is used to login the order integration system;
   determining, using the plurality of order message recognition processors, a plurality of purchase messages provided by the users on the plurality of social groups through the plurality of application programming interfaces;
   causing, using the social connection processor, the integration processor communicating with the plurality of order message recognition processors through the social connection processor;
   receiving, using the integration processor, the plurality of purchase messages and creating the plurality of purchase messages into an integration order according to a system authentication information of the user;
   generating, using the login switch processor, a login switching interface in a first social group of the plurality of social groups, wherein the login switching interface lists the plurality of social groups; and
   selecting a second social group of the plurality of social groups listed in the login switching interface, so as to log in to the second social group from the first social group.

9. The order integration method according to claim 8, wherein each of the plurality of purchase messages comprises a plurality of product names of the purchase operation interfaces of the plurality of social groups, a plurality of styles corresponding to the plurality of product names, and at least one of the purchase quantities corresponding to the plurality of styles.

10. The order integration method according to claim 8, wherein the step of determining the plurality of purchase messages provided by the user in the plurality of social groups comprises:
    providing a plurality of purchase operation interfaces in the plurality of social groups; and
    determining the plurality of purchase messages provided by the user in the purchase operation interfaces.

11. The order integration method according to claim 8, further comprises:
    receiving the system authentication information of the user to enable the user to log in to the order integration system.

12. The order integration method according to claim 11, wherein the steps of receiving the plurality of purchase messages and creating the integration order for the plurality of purchase messages comprises:
    creating the plurality of purchase messages into the integration order according to the system authentication information.

13. The order integration method according to claim 8, wherein the order integration system further comprises a product database coupled to the integration processor, and the order integration method further comprises:
    recording, using the product database, a plurality of styles corresponding to a plurality of product names and an inventory information corresponding to the plurality of styles.

14. The order integration method according to claim 13, wherein the steps of receiving the plurality of purchase messages and creating the integration order for the plurality of purchase messages comprises:
    integrating, using the integration processor, an inventory information of the product database and the integration order to monitor an inventory information corresponding to the integration order.

* * * * *